United States Patent [19]

Hamlen

[11] Patent Number: 5,488,655
[45] Date of Patent: Jan. 30, 1996

[54] METHOD AND SYSTEM FOR CONTROLLING TRAFFIC IN PSTN LINKS THROUGH THE USE OF VARIABLE PRICE INCENTIVES

[75] Inventor: Glen A. Hamlen, Denver, Colo.

[73] Assignee: U S WEST Technologies, Inc., Boulder, Colo.

[21] Appl. No.: 271,332

[22] Filed: Jul. 6, 1994

[51] Int. Cl.⁶ .................................................. H04M 15/00
[52] U.S. Cl. .......................... 379/114; 379/111; 379/112; 379/113; 379/115; 379/134; 379/137; 379/139
[58] Field of Search ................... 379/111–115, 219–221, 379/134, 137, 139

[56] References Cited

U.S. PATENT DOCUMENTS

| | | | |
|---|---|---|---|
| 3,560,658 | 10/1968 | Molloy | 379/139 |
| 4,156,109 | 5/1979 | Kraushaar | 379/137 |
| 4,224,479 | 9/1980 | Crawford | 379/196 |
| 4,250,354 | 2/1981 | Karras | 379/137 |
| 4,456,788 | 6/1984 | Kline et al. | 379/137 |
| 4,679,187 | 7/1987 | Irvin | 379/137 |
| 4,723,270 | 2/1988 | Okamoto | 379/134 |
| 5,060,258 | 10/1991 | Turner | 379/134 |
| 5,067,148 | 11/1991 | Sardana | 379/137 |
| 5,138,650 | 8/1992 | Stahl | 379/114 |
| 5,185,780 | 2/1993 | Leggett | 379/134 |
| 5,187,710 | 2/1993 | Chau et al. | 379/114 |
| 5,291,543 | 3/1994 | Freese | 379/114 |
| 5,361,297 | 11/1994 | Ortiz | 379/132 |

*Primary Examiner*—Stephen Chin
*Assistant Examiner*—Vijay Shankar
*Attorney, Agent, or Firm*—Timothy R. Schulte; Judson D. Cary; Stephen F. Jewett

[57] ABSTRACT

A method and system for controlling traffic in selected links of the Public Switched Telephone Network (PSTN) through the use of variable price incentives. The number of selected PSTN links which are available for use are determined at a predetermined time through the use of an appropriate traffic measurement system. Thereafter, a customer usage rate is determined for the selected PSTN links. The determined rate corresponds to the number of selected links which are available for use. An electrical signal is generated for receipt by the user and which contains information corresponding to the determined customer usage rate.

11 Claims, 4 Drawing Sheets

5,488,655

METHOD AND SYSTEM FOR CONTROLLING TRAFFIC IN PSTN LINKS THROUGH THE USE OF VARIABLE PRICE INCENTIVES

TECHNICAL FIELD

This invention relates generally to traffic engineering and, more particularly, to a method and system for controlling traffic in selected links of the Public Switched Telephone Network (PSTN) through the use of variable price incentives.

BACKGROUND ART

Traffic engineers have long been faced with the problem of how to properly size traffic networks in order to fully accommodate the required demand with minimal blocking. In the telecommunications industry, network sizing has historically been performed with reference to the "busy hour" which is a statistical creation having varying definitions in the art. Among them, the CCITT-Q.80 defines a mean busy hour as "the average busy hour traffic on the thirty busiest days of the year." In contrast, the North American standard averages only the ten busiest days of the year. Using this criteria, traffic engineers have designed networks to accommodate predetermined blocking percentages, i.e., one percent, etc. during the "busy hour." As readily seen, designers are thus either over building telecommunications networks or insuring excess capacity during off-peak times.

As an example, consider sizing interstate highway systems for a one percent chance of encountering a traffic jam during the ten busiest rush hours of the year. Certainly, there would be extra highway capacity during the off-peak times. Indeed, to accommodate the rush hour traffic, roads which could normally operate with two lanes might be required to have ten to twenty lanes in order to accommodate such rush hour traffic during the "busy hour."

The same is the case with telecommunication networks. FIG. 1 of the drawings is a representation of the estimated traffic intensity (mixed business and residential) over a typical working day in the United States.

Present telecommunication networks, however, make no attempt to flatten out the "busy hour" bulges of the typical working day. Instead, they are designed to uniformly accommodate a predetermined blocking percentage which results in over building as identified above. While this approach has, to date, been successful in the United States and many westernized countries, it is clearly wasteful of resources and is not suitable for application in less technologically advanced countries. Consider, for example, many Eastern European countries which have limited telephone service provided through an antiquated incumbent telephone network. The quickest and least expensive way to improve telephone service in these countries and provide the same to the masses is through the use of wireless telephone systems. These systems, however, must nonetheless be routed through the existing land-based network which, in most cases, is incapable of handling the surge of use which would result.

Thus, the only way to improve telephone service in these countries is to correspondingly update the incumbent telephone network or control the traffic routed therethrough. In contrast to telephone networks presently operable in the United States and many westernized countries which are egalitarian in nature, i.e., provide telephone service to all users at all times, new telephone networks could be designed with sufficient cost disincentives so as to control traffic during the "busy hour" and reduce the need for costly network modifications.

Consequently, a need exists for a method and system of controlling traffic in selected links of Public Switched Telephone Networks through the use of variable price incentives.

DISCLOSURE OF THE INVENTION

It is an object of the present invention to provide a method and system for controlling traffic in selected links of the Public Switched Telephone Network through the use of variable price incentives.

It is a further object of the present invention to provide a method and system as above which determines customer usage rates which correspond to the number of selected links available for use.

Still further, it is an object of the present invention to provide a method and system as above which is operable to generate an electrical signal for receipt by the user which contains information corresponding to the determined customer usage rate.

Yet still further, it is an object of the present invention to provide a method and system as above which further includes display means for displaying to the user the information which corresponds to the determined customer usage rate.

Still further, it is an object of the present invention to provide a method and system as above wherein the display means includes price band means for indicating to the user which of a plurality of predetermined price bands corresponds to the determined customer usage rate.

In carrying out the above-stated objects, there is provided both a method and system for controlling traffic in selected links of the Public Switched Telephone Network (PSTN) through the use of variable price incentives. The method includes the initial step of determining the number of selected PSTN links which are available for use at a predetermined time. Thereafter, a customer usage rate is determined for the selected PSTN links. This determined rate corresponds to the number of selected links which are available for use. Finally, an electrical signal is generated for receipt by the user. The electrical signal contains information corresponding to the determined customer usage rate. In a preferred embodiment, the method further includes the provision of display means such as a liquid crystal display (LCD) or a plurality of light emitting diodes (LEDs) for displaying to the user the information corresponding to the determined customer usage rate.

In keeping with the invention, a system is similarly provided for controlling traffic in the PSTN through the use of variable price incentives. The system includes traffic measuring means for measuring the current traffic in the PSTN and determining the number of the selected PSTN links which are available for use. The system further includes rate determination means for determining a customer usage rate for the selected PSTN links. As in the method, this determined rate corresponds to the number of selected links available for use. Finally, signal generating means is provided for generating an electrical signal for receipt by the user. Again, as in the method disclosed above, the electrical signal contains information corresponding to the determined customer usage rate. In the preferred embodiment, display means is also included for displaying to the user the determined customer usage rate.

It is a further object of the present invention to provide a method and system as above wherein the display means is provided in electrical communication with a land-based or wireless telephone handset.

Still further, it is an object of the present invention to provide a method and system as above wherein the determined customer usage rate is substantially proportional to the number of selected links determined to be available for use.

The above objects and other objects, features, and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

Figure 1:
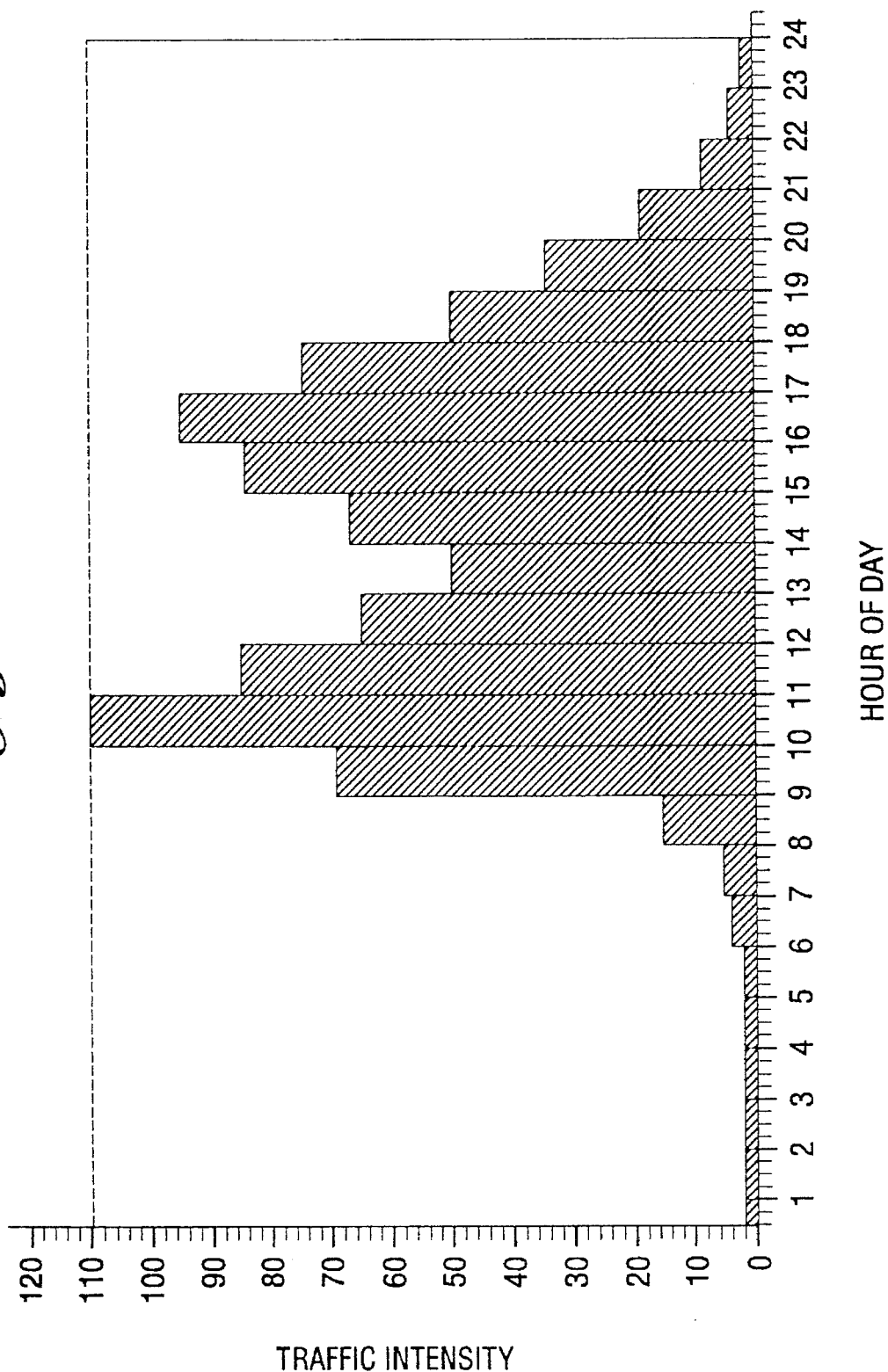
FIG. 1 is a bar chart of estimated traffic intensity over a typical working day in the United States (mixed business and residential)
Figure 2:
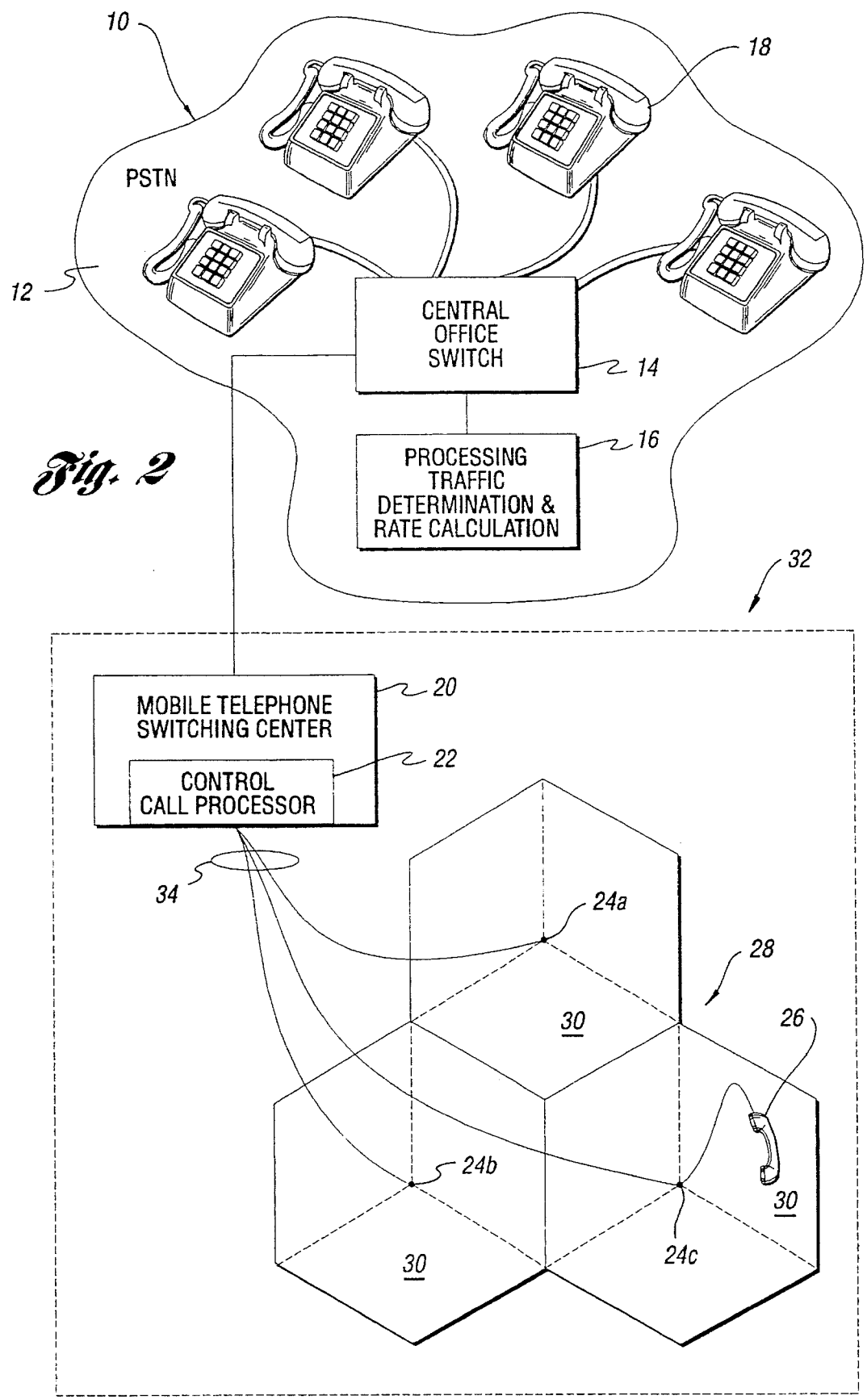
FIG. 2 is a schematic diagram of the system of the present invention.

Referring to FIG. 2 of the drawings, there is provided a schematic diagram of the system of the present invention identified generally by reference numeral 10. The system 10 includes the incumbent Public-Switched Telephone Network (PSTN) 12 which further includes at least one central office switch 14 which is further provided in electrical communication with processor 16 for determining traffic volume and making customer usage rate calculations for selected PSTN links. Central office switch 14 is further provided in electrical communication with a plurality of Customer Premises Equipment (CPE) devices such as land-based telephones 18. When used in a cellular environment, central office switch 14 is further provided in electrical communication with a mobile telephone switching center 20 which includes a control call processor 22.

As those skilled in the art will recognize, most metropolitan areas are now or soon will be equipped with one or more forms of wireless communication networks which provide mobile telephone and other related services to customers across a broad frequency spectrum. The cellular telephone application of FIG. 2 provides communication to a plurality of cell site transceivers 24a–24c. The cell site transceivers transmit radio signals to and receive signals from one or more mobile or stationary units 26 that may be placed or may move about a cellular service area 28. A mobile unit, as the term is used herein, refers to a wireless voice telephone or data receiver that can be permanently installed at a fixed location as referenced above or within a vehicle or it can be portable. Each cell site transceiver 24a is able to broadcast and receive the radio signals within a geographic area 30 called the cell site coverage area. Together, the areas 30 comprise the entire cellular service area 28. Typically, a cellular service area comprises a metropolitan area or larger region.

In the cellular system described above, when a telephone call to a called mobile unit 26 originates from either another mobile unit or a land-based telephone via the PSTN 12, a caller must first access the cellular telephone system 32. This task is accomplished by dialing the mobile unit's unique identification number (i.e., its phone number). The MTSC 20 receives the call request and instructs a central call processor 22 to begin call processing. The central call processor 22 transmits a signal over a dedicated line 34 (such as a telephone line or microwave link, etc. (to each of the cell site transceivers 24a–24c causing the cell site transceivers to transmit a page signal that the mobile unit 26 receives. The page signal alerts a particular mobile unit 26 that it is being called by including as part of the page signal the paged mobile unit's identification or phone number.

Each cell site transceiver 24 transmits the page signal on one or more dedicated forward control channels that carry all pages, as well as control signals, channel assignments, and other overhead messages to each mobile unit. The forward control channel is distinct from the voice channels that actually carry voice communications between a mobile unit and another mobile unit or a land-based telephone. Each cell site transceiver may have more than one forward control channel upon which pages can be carried.

When a mobile unit is not engaged in a telephone call, it operates in an idle state. In the idle state, the mobile unit will tune to the strongest available forward control channel and monitor the channel for a page signal or other messages directed to it. Upon determining that a page signal is being transmitted, the mobile unit 26 again scans all forward control channels so as to select the cell site transceiver transmitting the strongest signal. The mobile unit then transmits an acknowledgement signal to the cell site transceiver over a reverse control channel associated with the strongest forward control channel. This acknowledgement signal serves to indicate to the MTSC 20 which of the forward control channels (associated with the several cell site transceivers 24a–24c) to use for further call processing communications with mobile unit 26. This further communication typically includes a message sent to the mobile unit instructing it to tune to a particular voice channel for completion of call processing and for connection with the calling party. The details of how the cell site transceivers transmit the signals on the forward and reverse control channels are typically governed by standard protocols such as the EIA/TIA-553 specification and the air interface standards for Narrowband Analog Mobile Phone Service (NAMPS) and similar air interface standards for digital communications, all of which are well known to those of ordinary skill in the wireless telephone communications art and therefore will not be discussed.

Figure 3:
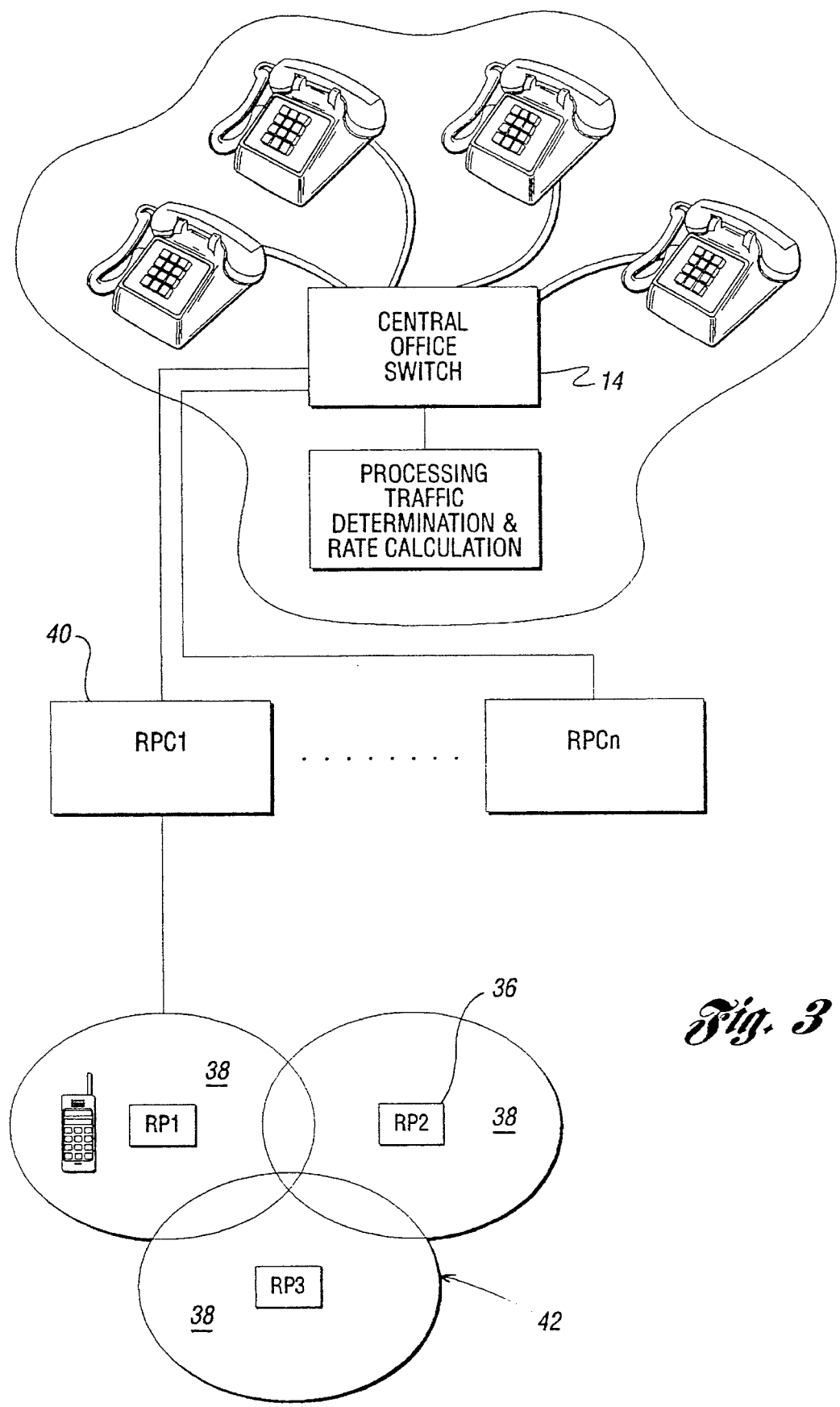
FIG. 3 is a schematic diagram of an alternative embodiment of the system of the present invention.

With reference now to FIG. 3 of the drawings, a non-cellular wireless communication network is described. As those skilled in the art will recognize, the Personal Communications Network (PCN) which is shown, is a relatively new concept in mobile communications developed specifically to serve limited geographic such as, for example, within office buildings or in campus-type environments. Like cellular telephony, a personal communications network relates telephone numbers to persons rather than fixed locations. Unlike cellular telephones, however, the PCN telephones are directed to small geographic areas thus defining "microcellular" areas designed to operate in similar fashion to large scale cellular telephone networks.

PCN technologies are also similar to residential cordless telephones in that they utilize base stations and wireless handsets. Unlike the former, however, PCN technology utilizes advanced digital communications features which may be implemented either as private networks or regulated services. When offered by communications carriers as services, this PCN capability is generally referred to as Personal Communications Services (PCS).

As shown in FIG. 3, the PCN system is also connected to central office switch 14 yet includes a Distributed Radio Port Controller (D-RPC) architecture which comprises a plurality of radio ports 36 (RP-1, RP-2, . . . RP-N), each having a corresponding coverage area 38 and provided in electrical communication with a corresponding Radio Port Controller 40 (RPC-1, RPC-2, . . . , RPC-N). Together, the RPCs 40 define a plurality of RPC serving areas 42 for transmitting and receiving calls from mobile terminals registered therein.

As recognized by those skilled in the art, a distributed radio port controller architecture is a modified hierarchical PCS network architecture in which the mobility functions (e.g. handover) and some vertical are handled by the radio port controllers 40. Thus, in accordance with the present invention, the RPCs 40 are interconnected via voice and signaling circuits and use distributed processing techniques to handle PCS mobility functions. This minimizes upgrades to the existing switches. The D-RPC architecture can also use a variety of transport options and configurations.

In keeping with the invention, the system and method disclosed herein is operative to determine through processor 16 the number of selected PSTN links which are available for use at a predetermined time. In the preferred embodiment, this determination is performed on a continuous real-time basis. Once this use determination has been made, processor 16 is further operative to determine in accordance with algorithms known to those skilled in the art the customer usage rate. In accordance with the invention, this customer usage rate corresponds to the number of selected links which are determined to be available for use. In fact, in a preferred embodiment, the usage rate is calculated to be substantially proportional to the number of selected links determined to be available for use so as to flatten out the "busy hour" bulges through price incentives. Finally, processor 16 is operative to generate an electrical signal for receipt by the user and preferably the user's handset. This electrical signal contains information-corresponding to the determined customer usage rate.

Figure 4:
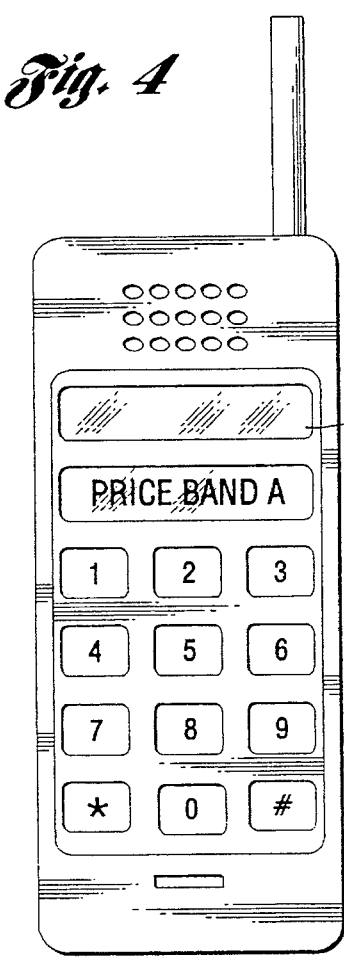
FIG. 4 is a schematic diagram of one embodiment of a handset used in accordance with the teachings of the present invention.
Figure 5:
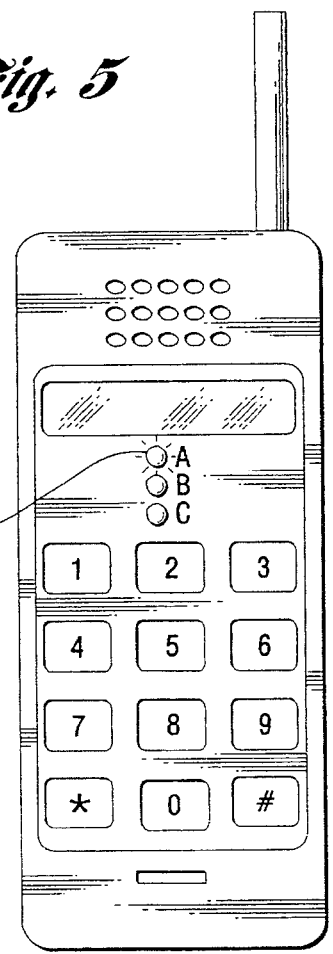
FIG. 5 is a schematic diagram of an alternative embodiment of a handset used in accordance with the teachings of the present invention.

As shown in FIGS. 4 and 5, the customer usage rate is typically provided to the user through a display means such as a liquid crystal display 44 as shown in FIG. 4 or light emitting diodes (LEDs) 46 as in FIG. 5. LCD 44 may be operative to provide the user with an actual current rate for placement of a call or, in an alternative embodiment, may provide the user with corresponding information such as whether the call is within one of a plurality of predetermined price bands (i.e., price band A, price band B, price band C). As shown in FIG. 5, LEDs 46 may further be provided which, when lit, correspond to predetermined price bands as well. LEDs 46 may, of course, emit the same color light or, in an alternative embodiment, may be operative to emit different colors of light such as a yellow light corresponding to price band C which may be designated the least expensive price band, a green light corresponding to price band B the next most expensive price band, and a red light corresponding to price band A, the most expensive price band.

Figure 6:
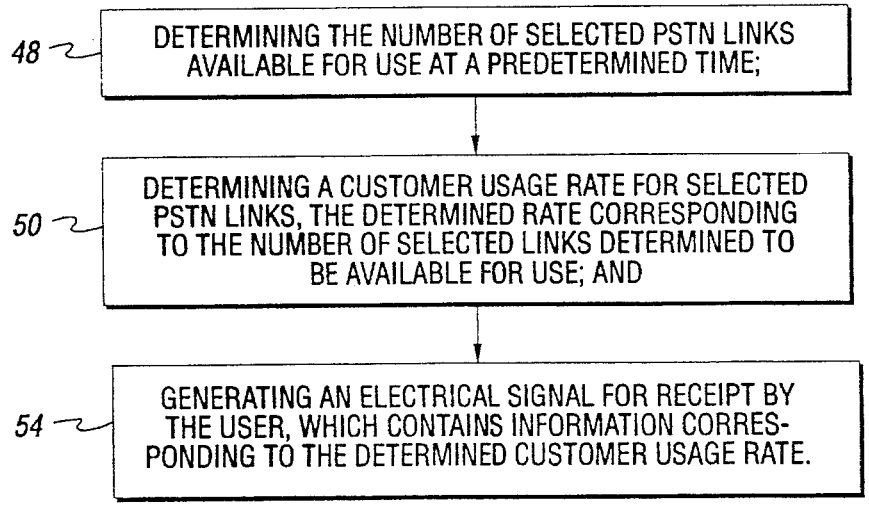
FIG. 6 is a generalized block diagram of the method steps of the present invention.

With reference to FIG. 6 of the drawings, the method of operation of the present invention is described. As referenced above, the method is specifically directed to controlling traffic in selected links of the PSTN through the use of variable price incentives. Thus, at the outset, the method includes determining 48 the number of selected PSTN links which are available for use at a predetermined time. The method further includes determining 50 a customer usage rate for the selected PSTN links. The determined usage rate corresponds to the number of selected links which have already been determined to be available for use. As referenced above, in a preferred embodiment, this rate may also be calculated to be substantially and virtually proportional to the number of selected links available for use.

Finally, in accordance with the invention, an electrical signal is generated 54 for receipt by the user. The electrical signal contains information corresponding to the determined customer usage rate and is provided to a display means such as that illustrated in FIGS. 4 and 5 to advise the user of the current rate or corresponding price band if the telephone is utilized. While determination of PSTN link availability and customer usage rate may be made at any predetermined time or times, it is anticipated that these determinations will ordinarily be made on a continuous real-time basis so as to provide the most current up-to-date information available to the user.

While the best modes for carrying out the invention have been described in detail, those familiar with the art to which this invention relates will recognize various alternative designs and embodiments for practicing the invention as defined by the following claims.

What is claimed is:

1. A preemptive method of controlling prospective customer telephone usage in selected PSTN links of the Public Switched Telephone Network (PSTN) through the use of variable price incentives, comprising:

determining on a substantially continuous real-time basis the number of said selected PSTN links which are available for use at a selected time;

determining on a real-time basis a customer usage rate for said selected PSTN links, said determined customer usage rate corresponding to the number of said selected links determined to be available for use at a selected time;

transmitting to a customer an electrical signal containing information corresponding to said determined customer usage rate; and displaying to said customer said information corresponding to said determined customer usage rate in response to said electrical signal.

2. A method as in claim 1, wherein said customer usage rate is divided into a plurality of predetermined price bands and said electrical signal identifies the price band.

3. A method as in claim 2, wherein the price band of the determined customer usage rate identified by the electrical signal is displayed to said customer by lighting one of a plurality of Light Emitting Diodes (LEDs), each of said LEDs operative to emit a predetermined color of light corresponding to one of said predetermined price bands.

4. A method as in claim 2, wherein the price band of the determined customer usage rate identified by the electrical signal is displayed to said customer in alphanumeric format on a Liquid Crystal Display (LCD).

5. The method as in claim 1, wherein said step of determining a customer usage rate for said selected PSTN links is performed on a substantially continuous real-time basis.

6. The method as in claim 1, wherein said step of transmitting to a customer an electrical signal containing information corresponding to said determined customer usage rate is performed on a substantially continuous real-time basis.

7. The method as in claim 1, wherein said customer usage rate is substantially inversely proportional to the number of said selected links determined to be available for use.

8. A preemptive system for controlling prospective customer telephone usage in selected PSTN links of the Public Switched Telephone Network (PSTN) through the use of variable price incentives, comprising:

traffic measuring means for measuring on a substantially continuous real-time basis the current traffic in the PSTN to determine a number of said selected PSTN links which are available for use;

rate determination means for determining on a real-time basis a customer usage rate for said selected PSTN links in response to said number of said selected links determined to be available for use;

signal generating means for generating an electrical signal for receipt by a customer, said electrical signal containing information corresponding to said determined customer usage rate; and a display for displaying to said customer said determined customer usage rate in response to said electrical signal.

9. The system as in claim 8, wherein said customer usage rate is divided into a plurality of predetermined price bands and said electrical signal identifies the price band, and said display is operative to display the price band of the determined customer usage rate identified by the electrical signal.

10. The system as in claim 9, wherein said display includes a plurality of Light Emitting Diodes (LEDs), each of said LEDs operative to emit a predetermined color of light corresponding to one of said predetermined price bands.

11. The method as in claim 9, wherein said display includes a Liquid Crystal Display (LCD) operative to indicate in alphanumeric format the determined price band.

* * * * *

UNITED STATES PATENT AND TRADEMARK OFFICE
CERTIFICATE OF CORRECTION

PATENT NO. : 5,488,655
DATED : January 30, 1996
INVENTOR(S) : GLEN A. HAMLEN

It is certified that error appears in the above-indentified patent and that said Letters Patent is hereby corrected as shown below:

Column 4, line 63: After "geographic" insert --areas--

Column 5, lines 24: After "vertical" insert --services--

Column 5, line 48: Delete the hyphen,

Column 5, line 53: After "as" insert --shown--

Signed and Sealed this

Twenty-fifth Day of June, 1996

Attest:

BRUCE LEHMAN

Attesting Officer  Commissioner of Patents and Trademarks